US010337315B2

(12) United States Patent
Horesh et al.

(10) Patent No.: US 10,337,315 B2
(45) Date of Patent: Jul. 2, 2019

(54) METHODS AND APPARATUS FOR COMPUTING ZONAL FLOW RATES IN RESERVOIR WELLS

(71) Applicant: International Business Machines Corporation, Armonk, NY (US)

(72) Inventors: Lior Horesh, North Salem, NY (US); Ankur Narang, New Delhi (IN); Karthik Visweswariah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 14/951,904

(22) Filed: Nov. 25, 2015

(65) Prior Publication Data

US 2017/0145813 A1    May 25, 2017

(51) Int. Cl.
| | |
|---|---|
| E21B 47/10 | (2012.01) |
| G01F 1/68 | (2006.01) |
| G01F 1/34 | (2006.01) |
| G01F 1/66 | (2006.01) |
| G01V 1/40 | (2006.01) |
| E21B 43/14 | (2006.01) |
| G01V 99/00 | (2009.01) |

(52) U.S. Cl.
CPC .............. *E21B 47/10* (2013.01); *E21B 43/14* (2013.01); *G01F 1/34* (2013.01); *G01F 1/66* (2013.01); *G01F 1/68* (2013.01); *G01V 1/40* (2013.01); *G01V 99/00* (2013.01)

(58) Field of Classification Search
CPC . E21B 47/10; E21B 43/14; G01F 1/68; G01F 1/34; G01F 1/66; G01V 1/40; G01V 99/00
See application file for complete search history.

(56) References Cited

U.S. PATENT DOCUMENTS

| 5,044,440 | A | * | 9/1991 | Stinessen | ................ E21B 43/01 |
| | | | | | 166/105.5 |
| 5,398,762 | A | * | 3/1995 | Stinessen | ................ E21B 43/01 |
| | | | | | 166/356 |
| 5,729,451 | A | | 3/1998 | Gibbs et al. | |
| 6,675,097 | B2 | | 1/2004 | Routh et al. | |
| 2002/0013687 | A1 | | 1/2002 | Ortoleva | |
| 2005/0149307 | A1 | * | 7/2005 | Gurpinar | ................ E21B 43/00 |
| | | | | | 703/10 |

(Continued)

OTHER PUBLICATIONS

IBM , Improving Operational and Financial Results through Predictive Asset Optimization, 2013.*

(Continued)

*Primary Examiner* — Mohammad K Islam

(74) *Attorney, Agent, or Firm* — Daniel P. Morris, Esq.; Hoffmann & Baron, LLP

(57) ABSTRACT

A method for determining at least one zonal flow rate of a reservoir well comprises: receiving input data representing at least one state parameter of the reservoir well; determining a generative model of the at least one state parameter and a generative model of the at least one zonal flow rate; iteratively adapting the generative models to minimize divergence from available data until the generative models and the available data converge; and, once the generative models and the available data converge, using the generative model of the at least one zonal flow rate to compute the at least one zonal flow rate.

24 Claims, 3 Drawing Sheets

(56) References Cited

U.S. PATENT DOCUMENTS

| | | | | |
|---|---|---|---|---|
| 2009/0294122 | A1* | 12/2009 | Hansen | E21B 43/00 166/250.01 |
| 2010/0313633 | A1 | 12/2010 | Anand et al. | |
| 2012/0059640 | A1* | 3/2012 | Roy | G06F 17/5009 703/10 |
| 2012/0158307 | A1* | 6/2012 | Jay | E21B 47/065 702/11 |
| 2013/0090855 | A1* | 4/2013 | Rasmus | E21B 47/06 702/9 |
| 2013/0175030 | A1* | 7/2013 | Ige | E21B 43/128 166/250.15 |
| 2013/0318020 | A1 | 11/2013 | Shapero et al. | |
| 2014/0083687 | A1 | 3/2014 | Poe et al. | |
| 2014/0191120 | A1 | 7/2014 | Donderici et al. | |
| 2016/0154129 | A1* | 6/2016 | Sayers | E21B 43/26 702/13 |
| 2016/0341850 | A1* | 11/2016 | Lin | E21B 41/0092 |
| 2017/0139071 | A1* | 5/2017 | Stokely | E21B 47/123 |

OTHER PUBLICATIONS

Elsheikh et al., An Ensemble Based Nonlinear Orthogonal Matching Pursuit Algorithm for Sparse History Matching of Reservoir Models, 2013, p. 1-12.*

Khaninezhad II et al., Sparse geologic dictionaries for subsurface flow model calibration: Part II, 2012, p. 122-136.*

Muradov et al., Zonal Rate Allocation in Intelligent Wells (Year: 2009).*

Elsheikh et al., An Ensemble Based Nonlinear Orthogonal Pursuit Algorithm for Sparse History Matching of Reservoir Models (Year: 2013).*

Khaninezhad II et al., Sparse geologic dictionaries for subsurface flow model calibration: Part II (Year: 2012).*

IBM, Improving Operational and Financial Results through Predictive Asset Optimization (Year: 2013).*

Kuznetsov, "On the Convergence of the Gaver-Stehfest Algorithm," SIAM J. Numer. Anal., v. 51, n. 6, 2013, pp. 2984-2998, http://www.math.yorku.ca/~akuznets/Gaver_Stehfestpdf.

Spendier, "Notes on Numerical Laplace Transformation," Apr. 12, 2010, pp. 1-5, http://www.unm.edu/~aierides/505/NotesOnNumerical-LaplaceInversion.pdf.

Aharon et al., "K-SVD: An Algorithm for Designing Overcomplete Dictionaries for Sparse Representation," IEEE Trans. on Signal Proc., v. 54, n. 11, Nov. 2006, p. 4311-4322, http://www.cs.technion.ac.il/~freddy/papers/120.pdf.

ISA—The Instrumentation, Systems, and Automation Society, The Automation, Systems, and Instrumentation Dictionary, 4th ed. 2003, 4 pages (excerpts).

IEEE Computer Society, Software and Systems Engineering Vocabulary, 2006, 1 page (excerpt).

University of Texas at Austin Petroleum Extension Service (PETEX), A Dictionary for the Oil and Gas Industry, 1st Ed. 2005, 3 pages (excerpts).

Ahmed H. Elsheikh et al., "Sparse calibration of subsurface flow models using nonlinear orthogonal matching pursuit and an iterative stochastic ensemble method," Advances in Water Resources, Jun. 2013, pp. 14-26, vol. 56.

Mohammadreza M. Khaninezhad et al., "Sparse Randomized Maximum Likelihood (SpRML) for subsurface flow model calibration and uncertainty quantification," Advances in Water Resources, Jul. 2014, pp. 23-37, vol. 69.

Khafiz Muradov et al., "Some Case Studies of Temperature and Pressure Transient Analysis in Horizontal, Multi-zone, Intelligent Wells," Society of Petroleum Engineers (SPE) 164868, 75th European Association of Geoscientists and Engineers (EAGE) Conference and Exhibition Incorporating SPE EUROPEC, Jun. 2013, pp. 2804-2815, vol. 4.

Khafiz Muradov et al., "Zonal Rate Allocation in Intelligent Wells," Society of Petroleum Engineers (SPE) 121055, 71st European Association of Geoscientists and Engineers (EAGE) Conference and Exhibition Incorporating SPE EUROPEC, Jun. 2009, pp. 3718-3731, vol. 6.

* cited by examiner

METHODS AND APPARATUS FOR COMPUTING ZONAL FLOW RATES IN RESERVOIR WELLS

BACKGROUND

The present invention relates generally to the electrical, electronic and computer arts, and, more particularly, to techniques for computing zonal flow rates in reservoir wells.

The accurate real-time estimation of zonal flow in reservoir wells remains a challenge to date. The ability to monitor flow in such settings is of significance in reservoir operations, such as, for example, production operation and management, preventative maintenance scheduling and reservoir characterization improvement. Some of the specific challenges associated with flow monitoring include, but are not limited to, identification of the contribution of different productive zones to the total flow measured at the well head, description of production behavior for each individual zone, and timely detection of flow trends and changes.

BRIEF SUMMARY

Principles of the invention, in accordance with embodiments thereof, provide techniques for determining at least one zonal flow rate of a reservoir well. In one aspect, a method for determining at least one zonal flow rate of a reservoir well comprises: receiving input data representing at least one state parameter of the reservoir well; determining a generative model of the at least one state parameter and a generative model of the at least one zonal flow rate; iteratively adapting the generative models to minimize divergence from available data until the generative models and the available data converge; and, once the generative models and the available data converge, using the generative model of the at least one zonal flow rate to compute the at least one zonal flow rate.

In accordance with another embodiment of the invention, an apparatus includes a memory and at least one processor coupled to the memory. The processor is operative: to determine at least one zonal flow rate of a reservoir well comprises: to receive input data representing at least one state parameter of the reservoir well; to determine a generative model of the at least one state parameter and a generative model of the at least one zonal flow rate; to iteratively adapt the generative models to minimize divergence from available data until the generative models and the available data converge; and, once the generative models and the available data converge, to use the generative model of the at least one zonal flow rate to compute the at least one zonal flow rate.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Embodiments of the present invention will be described herein in the context of illustrative methods and apparatus for monitoring zonal flows in reservoir wells. It is to be appreciated, however, that the invention is not limited to the specific apparatus and/or methods illustratively shown and described herein. Moreover, it will become apparent to those skilled in the art given the teachings herein that numerous modifications can be made to the embodiments shown that are within the scope of the claimed invention. Thus, no limitations with respect to the embodiments shown and described herein are intended or should be inferred.

Figure 1:
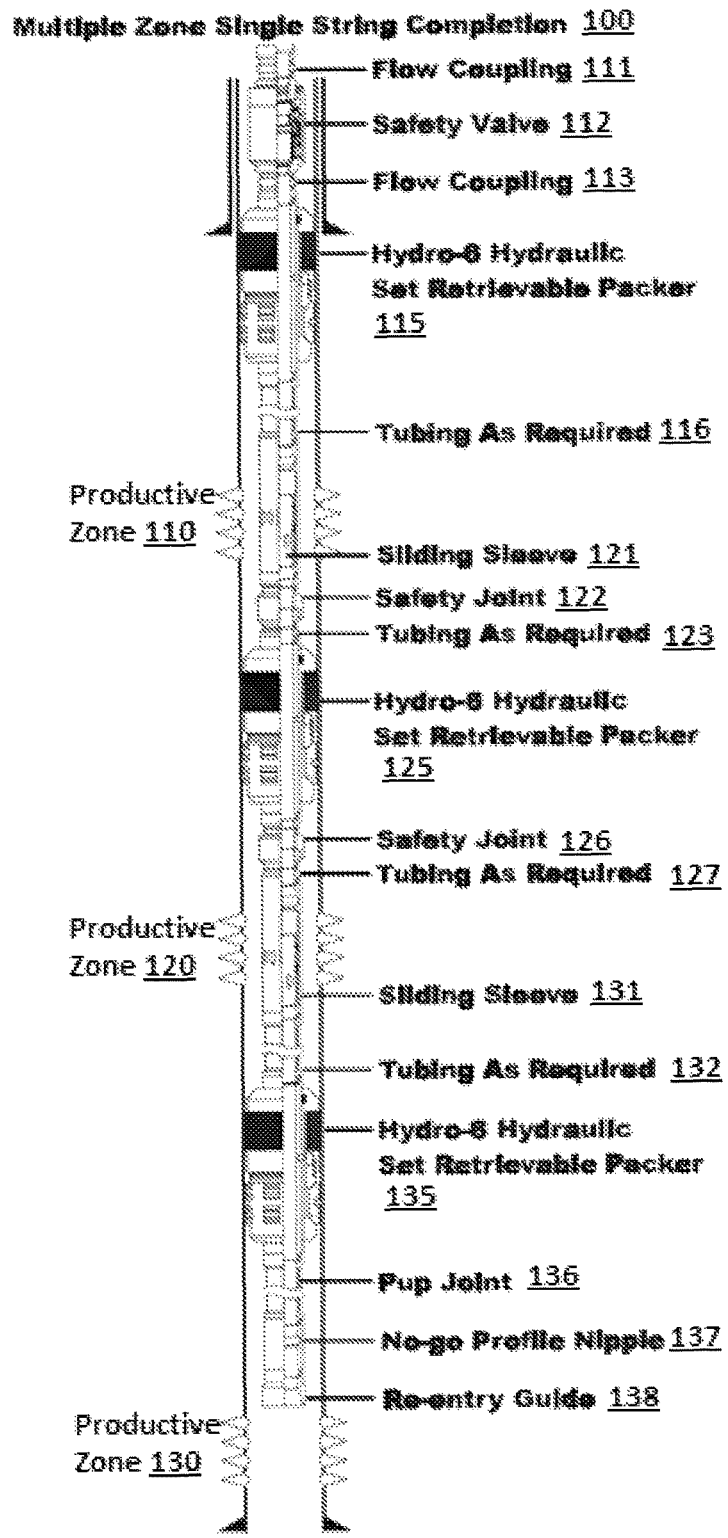
FIG. 1 depicts an exemplary reservoir well that may be useful in implementing one or more aspects and/or elements of the invention.

FIG. 1 depicts an exemplary reservoir well that may be useful in implementing one or more aspects and/or elements of the invention. Specifically, FIG. 1 depicts an exemplary reservoir well having a multiple zone single string completion 100. As is known by one skilled in the art, such a reservoir well allows for extraction of a resource (which may include, for example, one or more liquids such as petroleum and/or gases such as propane) from a plurality of productive zones, which may be located at different depths, for example. In one embodiment, the reservoir well is used to extract a multiphase flow including a mixture of oil, gas, and water. Well 100 includes perforation intervals at each of three productive zones 110, 120, 130. The number of productive zones is purely exemplary, as is the choice of well completion. One skilled in the art would understand that aspects of the invention can be applied to other well completions, such as multiple string completions.

Each of the productive zones has associated therewith an isolation packer 115, 125, 135. In this exemplary embodiment, these packers are Hydro-6 hydraulic-set retrievable packers commercially available from Schlumberger. Sliding sleeves are positioned between each packer. Thus, sliding sleeve 121 is located between packers 115 and 125, and sliding sleeve 131 is located between packers 125 and 135. Although the combination of isolation packers and sliding sleeves can be configured to allow for selective isolation of the productive zones, it is often preferable to produce a comingled flow to allow for simultaneous extraction from all of the productive zones.

Safety joints, also known as blast joints, are also positioned between the packers to reduce the risk of erosion damage to the tubing string. Thus, joint 122 is located between packers 115 and 125, and joint 126 is located between packers 125 and 135. Tubing 116, 123, 127, 132 may also be installed between the aforementioned components where doing so is necessary or desirable.

The top portion of well 100 (i.e., above packer 115) includes a pair of flow couplings 111 and 113 with a safety valve 112 therebetween. The flow couplings reduce the risk of erosion damage to the tubing string, while the safety valve facilitates emergency containment. The bottom portion of well 100 (i.e., below packer 135) includes pup joint 131, no-go profile nipple 132, and re-entry guide 133. Pup joint 131 may be optionally inserted to adjust the length of the string. The no-go profile nipple 132 provides an installation point for sensors, and also prevents dropped tools from falling out of the end of the tubing. The re-entry guide 133 allows easy re-entry into the tubing of well intervention tool strings, such as wireline or coiled tubing.

Although not shown in FIG. 1, fiber optic cable (FOC) may be attached to either the outside of the inner casing over the full length or connected to the outside of the production tubing. Thus, an exemplary embodiment may implement fiber optics distributed acoustic sensing (DAS) using sound signals derived from fiber optic cable aligned along well casing. Optical pulses of light enter a fiber optic cable and very small levels of reflected light (back scatter) within the fiber are detected and interpreted. Any acoustic event along the entire fiber length creates sound waves in the ground which cause micro-changes in the shape of the fiber which disturbs the back scatter. An acoustic signal is then rebuilt from the change in the back scatter data. In addition to helping to monitor production from different perforation intervals and initiate timely remedial action in accordance with aspects of the present invention further discussed herein, fiber optics DAS can also monitor fracture growth in reservoirs.

Exemplary embodiments of well 100 may be operative to generate a continuous stream of data, including PVT (pressure, volume, and temperature) analysis of fluids. For example, well 100 may have bottom hole pressure (BHP) and bottom hole temperature (BHT) gauges installed at every perforation interval, e.g., productive zones 110, 120, 130. There may be temperature, pressure and/or flow rate gauges at the wellhead. Well 100 may implement distributing temperature sensing (DTS), distributed pressure sensing (DPS), and/or distributed acoustic sensing (DAS). Such systems advantageously allow detection, classification, and activity along the entire length of the FOC. For example, there may be pressure, temperature, and/or acoustic sensor readings every meter (or every few meters). There may also be strain measurements every centimeter (or every few centimeters).

In addition to the aforementioned sensory data, well parameters may also be used by embodiments of the present invention. Well parameters may include well geometry, such as geometry of pipe and orifice, expansion coefficients of the pipe and orifice, and/or geometry of pressure taps. Other well parameters may include dynamic viscosity, density at process conditions, porosity, saturation, permeability, and/or relative permeability; these parameters may be measured using sonic, gamma ray, neutron porosity, and/or resistivity techniques.

Despite the large volume and richness of well data signals (e.g., DTS, DPS, and DAS data, as well as well logs and well parameters), accurate real time monitoring of zonal flow rates (e.g., the flow rate of oil, water and/or gas at each productive zone 110, 120, 130 at specified time intervals) remains problematic. Monitoring of zonal flow rates may also include identification of the contribution of the different productive zones to the total flow measured at the well head, description of production behavior (e.g., decline curve) of each individual zone, and timely detection of flow trend and changes.

However, several factors contribute to the complex nature of high fidelity zonal flow rate inference, including:

Ill-posedness—only limited (spatially) number of indirect boundary measurements are taken, entailing infinite number of states that equally match the data Model mis-specification—physical models (particularly of multi-physics problems) host a broad range of inadequacies, from formulation, through numerical estimation to stability Process conditions—imperfect knowledge of the process conditions (e.g. errors in viscosity or density estimation), especially at large depths of the reservoir, inherently propagates as uncertainty in flow rate Rapid, voluminous data—data is of high volume and rate, requiring computationally efficient infrastructure for its processing Exemplary embodiments of the present invention advantageously address the aforementioned shortcomings of the prior art by minimizing the amount of input data required for accurate zonal flow rate monitoring, as well as handling model mis-specification and recovering model errors. Thus, embodiments allow for real time analysis of streaming well data to accurately estimate zonal flow rates.

Exemplary embodiments provide numerous technical advantages relative to the prior art. For example, embodiments of the present invention facilitate reservoir operations such as production optimization and management, preventative maintenance scheduling, and improved reservoir characterization. Embodiments of the present invention may also: monitor and optimize production performance, predict zonal flow rates in the future using predictive analytics, schedule preventive maintenance accurately, provide real time continuous reservoir surveillance, optimize reservoir management, prioritize production operations and operational response, and/or provide early warning for deteriorating conditions.

Thus, embodiments of the present invention can improve the productivity, safety, and characterization of reservoirs. For example, embodiments of the present invention may allow well operators to optimize recovery by accurately monitoring production from various contributing production zones, as well as by accurately monitoring fracture growth and behavior. Embodiments may also advantageously facilitate optimization of work-over, stimulation, fracturing, and/or acidizing jobs, for example, allowing for more effective work-overs and more efficient stimulation jobs. Embodiments may also allow for increased safety through early detection and prediction of anomalous situations, such as abnormal microseismic activity. Thus, embodiments may allow for optimized use of assets and consumables, including optimized reservoir targeting. Embodiments may also produce a significant reduction in unplanned deferment and improved production rates from wells.

Embodiments of the present invention involve an inversion framework, and more particularly a novel bi-level non-convex non-linear optimization formulation for accurate inversion. Embodiments of the present invention include a joint inversion with model mis-specification handling which mitigates ill-posedness and uncertainty through structure exploitation of a sparse representation of state and zonal fluid flows, followed by formulation of a stochastic optimization approach for low rank recovery. Embodiments may also include dictionary learning for better posed-ness of the problem, resulting in a higher quality and geologically consistent solution. Such embodiments may also include tuning and updating of the dictionary, as well as other interactive optimization with user feedback and controls.

The inventors have found that the salient dimension of the underlying flow behavior (and its state space) resides in a far lower dimension than expected by conventional means of inference. Embodiments of the present invention advantageously leverage this finding for: (1) Model reduction—for situations where the fidelity of the model is exceeding the desired one and efficient computation is essential (e.g. Proper Orthogonal Decomposition, Discrete Empirical Interpolation Method); and (2) Uncertainty mitigation—through introduction of a universal governing principle/a-priori assumption, such as simplicity. Leveraging these simplicity assumptions (e.g. sparse representation, nuclear/atomic norm, manifolds, etc) advantageously provides superior fidelity and accuracy of the flow inference problem.

With the above in mind, it may be helpful to formally define the problem of finding a high fidelity estimate of the flow rate q. Let m be the model parameters (e.g. geometry, permeability, porosity) that may involve uncertainty. The state parameters (pressure P, temperature T, viscosity $\mu$, density $\rho$) are defined by the fields $u \equiv \{p,T,\mu,\rho\}$. The controls (pressure $p_c$, rate $q_c$) are denoted by $c \equiv \{p_c,q_c\}$. Let g be a simulation model that links controls c and model parameters m with the state u, where model mis-specification error is represented by $\eta: u=g(c;m)+\eta$.

The observation operator F links the state u with the observables $d \equiv \{p^{obs}, T^{obs}, \mu^{obs}, \rho^{obs}\}$ along with measurement noise $\in$, as follows: $d=F(u)+\in$. Zonal flow q is related to state parameters, and model mis-specification error $\zeta: q=h(u,m,c)+\zeta$.

Assume the state fields $u=\{p,T,\mu,\rho\}$ representation can be determined sparsely using a sparsity generative model: $u=\mathcal{G}_1(D_1,\alpha)$ where $D_1$ is a dictionary (or any other space spanning object) and $\alpha$ is a sparse vector and a function of time. Because state u comprises several types of parameters, $D_1$ can be a heterogeneous dictionary $$\begin{pmatrix} D_p & & & \\ & D_T & & \\ & & D_\mu & \\ & & & D_\rho \end{pmatrix}$$

and the sparse vector $\alpha$ could be $$\begin{pmatrix} \alpha_p \\ \alpha_T \\ \alpha_\mu \\ \alpha_\rho \end{pmatrix}.$$

Assume that the zonal flow q can be represented sparsely using the generative model: $q=\mathcal{G}_2(D_2,\lambda)$ where $D_2$ is a dictionary (or any other space spanning object) and $\lambda$ is a sparse vector and a function of time. In a bi-level optimization framework, the optimization problem for sparse recovery of the state, zonal flows and model can be formulated as follows:

$$\min \; \mathcal{L}_1(F(\mathcal{G}_1(D_1,\alpha);m),d) + \mathcal{L}_2\left(\sum \mathcal{G}_2(D_2,\lambda), q_{total}^{obs}(m)\right) + \beta \mathcal{R}(\alpha,\lambda)$$

s.t. $\|\alpha\|_0 \leq \tau_1$ $\|\lambda\|_0 \leq \tau_2$ $\mathcal{P}_1(\mathcal{G}_1(D_1,\alpha), g(c,m)) \leq f_1(\hat{\eta})$ $\mathcal{P}_2(\mathcal{G}_2(D_2,\lambda), h(u,c,m)) \leq f_2(\hat{\zeta})$ $\hat{\eta} = \min_\eta \|\eta(\alpha)\|_*$ $\hat{\zeta} = \min_\zeta \|\zeta(\lambda)\|_*$ where $P_1$, $P_2$ are noise models for state parameter estimation and zonal flow estimation respectively; R is a regularization function considering both $\alpha$ and $\lambda$; $T_1$, $T_2$ are cardinality thresholds to ensure sparse reconstruction of state vector (u) and zonal flow vector (q); $q_{total}^{obs}$ is measured total flow at the surface (wellhead) which may include the respective flows of oil, gas and water at the surface; $L_1$, $L_2$ are loss functions suitably chosen to represent deviation from observed values; $f_1$, $f_2$ are model mis-specification influence models for state parameter estimation and zonal flow estimation respectively; $\mathcal{G}_1$, $\mathcal{G}_2$ are generative models for state parameter estimation and zonal flow estimation respectively and $\|.\|_*:=\Sigma\sigma_i$ represents the nuclear norm operator, which is the sum of the singular values of the operand.

An embodiment may optionally include various techniques for incorporating structural characteristics (which may include constraints and/or limitations) for flow q and/or state u. These characteristics can be explicit, such as: (a) Vorticity—for close to laminar flow, vortices/turbidity is less likely and can be penalized, e.g $\|\nabla \times u\|$; (b) Energy $\|Gu\|_2^2$; and/or (c) Continuity $$\left\|\frac{\partial f(u)}{\partial t} - \nabla \cdot g(f(u))\right\|.$$

These characteristics can also be implicit instead, such as: (a) Sparsity—signals/state can be represented by a small number of elements $\|\alpha\|_1$; (b) Low rank—the rank of the representation/spanning set is small $\|\theta\|_*$; and/or (c) Operator splitting—the state can be represented as a composite of low rank & sparse represented signal (or any other norm mixture):

$$\min_{\alpha,\theta} \|\alpha\|_1 + \gamma\|\theta\|_*$$

$$\text{s.t. } u = \alpha + \theta$$

An embodiment may also incorporate a goal-oriented inference approach, in which goal-oriented modeling informs goal-oriented inference which informs a decision. The dimension of the desired inferred entities (flow rates) is far lower than that of the model state. Thus, an illustrative embodiment incorporating a goal-oriented inference approach may avoid explicit recovery of an intermediate high dimensional state and instead link directly the desired inferred entity and the data, thereby achieving a high-quality inversion in reduced time.

Thus, embodiments of the present invention involve an advanced inversion framework for estimation of zonal flow rate using data from reservoirs. A sparse modeling based bi-level interactive optimization formulation solution may involve iteratively solving convergence, minimizing the divergence with respect to available flow and distributed sensing data, and recovering the most accurate model, using sparse representation of state parameters and the desired estimate (flow rate). State and flow rate estimation may be performed by non-linear inversion with model fidelity constraints. The model may use mis-specification recovery to resolve errors in physical modeling using provided data.

More particularly, embodiments of the present invention involve a bi-level optimization framework that performs joint non-linear inversion with model mis-specification handling. The bi-level optimization framework can be solved using techniques such as stochastic optimization with low rank recovery: within the solution, the uncertainty in zonal flow rates and state parameters is quantified and also reduced to desirable limits using interactive user feedback. A goal-oriented inference approach may be used in which focusing on inference of desired variables leads to faster convergence. For example, goal-directed inversion formulation may be utilized so that data and optimizations are focused on zonal flow rate inference.

Figure 2:
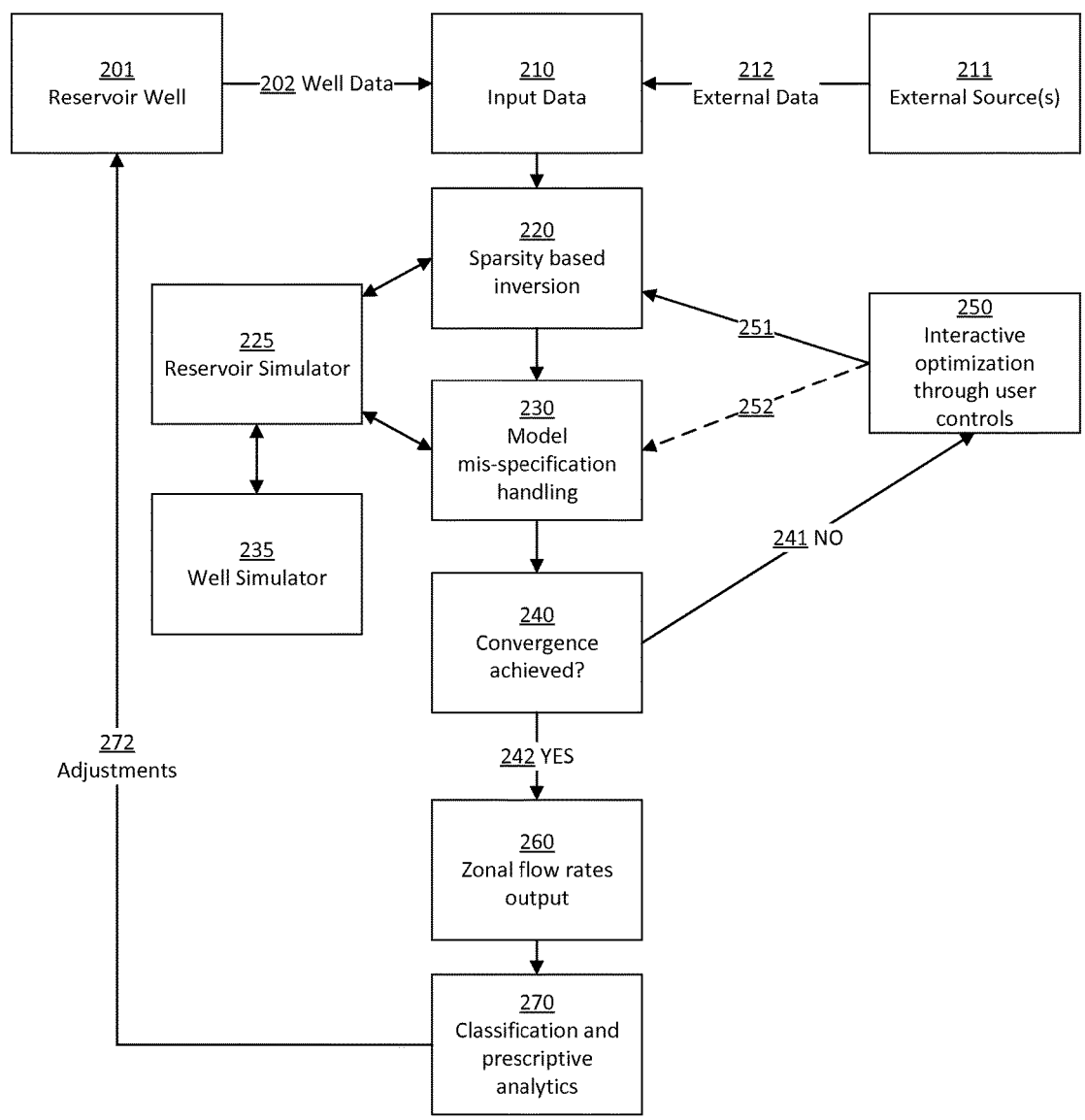
FIG. 2 is a flow diagram depicting at least a portion of an exemplary method for monitoring zonal flow rates, according to an embodiment of the invention.

FIG. 2 is a flow diagram depicting at least a portion of an exemplary method for monitoring zonal flow rates, according to an embodiment of the invention. The method begins with the receipt of input data 210, which may be structured and/or unstructured. Receipt of input data 210 may include receipt of well data 202 from reservoir well 201, which may be real time streaming sensory (e.g., DTS, DPS, and/or DAS) data and/or production (e.g., oil, gas, water) data. Reservoir well 201 may, for example, be similar to reservoir well 100 discussed above with reference to FIG. 1. Receipt of input data 210 may additionally or alternatively include receipt of external data 212 from external data source(s) 211. External data 212 may include, for example, a reservoir well model (which may include well geometry and other static parameters of the well) and/or other relatively static (e.g., batch mode rather than streaming) data.

Step 220 involves sparsity based inversion, as discussed above. Step 220 may include inference of zonal flow rates with adaptive prototype generative models. The sparsity based inversion 220 may involve bidirectional communication (e.g., interaction) with a calibrated reservoir simulator 225, which in turn has bidirectional communication (e.g., interaction) with a calibrated well simulator 235, that can be used to determine effects of potential changes to parameters of reservoir well 201 without actually implementing these (untested and possibly deleterious) changes on reservoir well 201. Step 230 involves model mis-specification handling, also as discussed above, to resolve errors in physical modeling using provided data, and more particularly through a hybrid physics-based and data-driven approach. The model mis-specification handling 230 may also involve bidirectional communication (e.g., interaction) with the reservoir simulator 225, which in turn has bidirectional communication (e.g., interaction) with the well simulator 235.

Step 240 tests to see whether convergence is achieved. If step 240 determines that convergence is not achieved (241), the method proceeds to step 250. Step 250 involves interactive optimization in which a user can provide feedback and/or make changes 251, 252 with respect to parameters associated with sparsity based inversion step 220 and/or model mis-specification handling step 230. Examples of parameters which may be interactively optimized by a user in step 250 include: dictionary tuning and/or update (e.g., $D_1$ and/or $D_2$); regularization functions (e.g., R); physical model selection and/or tuning (e.g., m); and/or sparsity constraints (e.g., $T_1$, $T_2$). After step 250, the method returns to step 220, as indicated by the solid arrow 251 rather than the dotted arrow 252.

If step 240 determines that convergence is achieved (242), the method proceeds to step 260, in which the zonal flow rates are output. This may involve, for example, communicating the rates to a user (e.g., on a local display and/or via an electronic message) and/or storing the rates (e.g., in a data store) for future reference. Step 270 includes classification and prescriptive analytics based at least in part on the zonal flow rates output in step 260. For example, as discussed above, the zonal flow rates can be used to determine adjustments 272 which should be made to operational parameters associated with well 201 in order to optimize its performance, and/or to detect potential hazardous situations where a production flow is already damaged or will get damaged in the near future.

Steps 210, 220, 230, 240, 250, 260 and/or 270 may be implemented local (e.g., on-site real time analytic processing (RTAP)) or remote (e.g., an on-shore real time operations center (RTOC)) to reservoir well 201. In one embodiment, substantially similar input data is received (e.g., 210) by both an on-site RTAP and an off-site RTOC. The on-site RTAP uses in-motion analytics (e.g., InfoSphere Streams software commercially available from International Business Machines (IBM)) to generate ultra-low latency results in step 260 and to make direct operational adjustments to the well in step 270. The off-site RTOC uses traditional analytics (e.g., a data warehouse/Hadoop) to generate more detailed results and reports in step 260 and to make longer term field development adjustments in step 270. In order to support large scale data handling and high performance analytics, a preferred embodiment implements at least a portion of these steps using software commercially available from IBM, such as Big Insights and/or other components of the Big Data platform, and/or hardware commercially available from IBM, such as high-performance computer clusters and/or servers.

Given the discussion thus far, it will be appreciated that, in general terms, an exemplary method for determining at least one zonal flow rate of a reservoir well according to an aspect of the invention comprises: receiving input data representing at least one state parameter of the reservoir well; determining a generative model of the at least one state parameter and a generative model of the at least one zonal flow rate; iteratively adapting the generative models to minimize divergence from available data until the generative models and the available data converge; and, once the generative models and the available data converge, using the generative model of the at least one zonal flow rate to compute the at least one zonal flow rate.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 3:
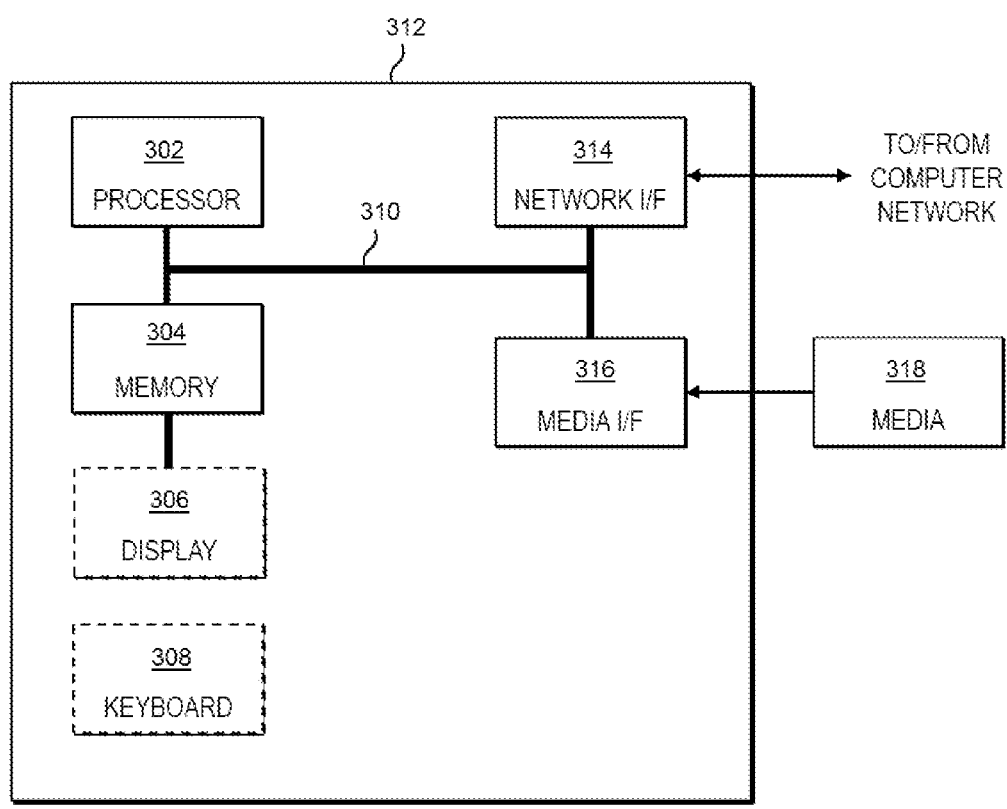
FIG. 3 depicts a computer system that may be useful in implementing one or more aspects and/or elements of the invention.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a reservoir simulation module (e.g., consistent with the reservoir simulator 225 in FIG. 2) and a calibrated well simulation module (e.g., consistent with the calibrated well simulator 235 in FIG. 2). The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining and implementing an operational adjustment to a reservoir well, the method comprising:
   receiving input data representing at least one state parameter of the reservoir well;
   determining a generative model of the at least one state parameter and a generative model of the at least one zonal flow rate;
   iteratively adapting the generative models to minimize divergence from available data until the generative models and the available data converge;
   once the generative models and the available data converge, using the generative model of the at least one zonal flow rate to compute the at least one zonal flow rate;

based on the computed at least one zonal flow rate, determining the operational adjustment for the reservoir well; and communicating and implementing the operational adjustment to the reservoir well;

wherein at least one of determining the generative models and iteratively adapting the generative models comprises a joint non-convex non-linear inversion with goal-directed inversion formulation focused on inference of the at least one zonal flow rate.

2. The method of claim 1, wherein the generative model of the at least one state parameter comprises a sparse representation of the at least one state parameter and wherein the generative model of the at least one zonal flow rate comprises a sparse representation of the at least one zonal flow rate.

3. The method of claim 1, wherein iteratively adapting the generative models comprises interactive optimization in which at least one dictionary upon which at least one of the generative models is based is updated at least in part based on user feedback.

4. The method of claim 1, wherein the joint non-convex non-linear inversion further comprises a model mis-specification handling which utilizes a hybrid physics-based and data-driven approach.

5. The method of claim 1, wherein the joint non-linear inversion comprises formulating a bi-level optimization framework.

6. The method of claim 5, wherein the at least one of determining the generative models and iteratively adapting the generative models further comprises solving the bi-level optimization framework using stochastic optimization with low rank recovery.

7. The method of claim 1, wherein iteratively adapting the generative models comprises:
quantifying uncertainty of at least one of the at least one state parameter and the at least one zonal flow rate; and
reducing said uncertainty to a specified limit using interactive user feedback.

8. The method of claim 1, wherein the input data comprises distributed acoustic sensing (DAS) data.

9. The method of claim 8, wherein at least a portion of the DAS data represents back scatter within a fiber optic cable attached to the reservoir well.

10. The method of claim 1, wherein the input data comprises a well log from the reservoir well and a well model from another data source.

11. The method of claim 1, wherein:
the at least one state parameter comprises a plurality of state parameters;
each of the input data, the available data, and the generative model of the at least one state parameter is representative of each of the plurality of state parameters; and
the plurality of state parameters comprises pressure, temperature, viscosity, and density.

12. The method of claim 1, wherein the reservoir well comprises a plurality of perforated productive zones isolated by packers, and wherein the at least one zonal flow rate represents a relative contribution of at least a given one of the plurality of zones to a multiphase flow at a head of the well.

13. The method of claim 12, further comprising determining a decline curve for at least the given one of the plurality of zones.

14. The method of claim 1, further comprising performing analytics based at least in part on the computed at least one zonal flow rate, the analytics comprising at least one of predictive analytics and prescriptive analytics.

15. The method of claim 14, wherein the analytics comprises increasing safety through early detection of abnormal micro seismic activity.

16. The method of claim 14, wherein the analytics comprises monitoring fracture growth and behavior to optimize recovery from the reservoir well.

17. The method of claim 1, wherein at least one of determining the generative models and iteratively adapting the generative models comprises use of a reservoir simulator in bidirectional communication with a well simulator.

18. The method of claim 1, wherein during the joint non-convex non-linear inversion, the generative models are subject to respective sparsity constraints.

19. The method of claim 18, wherein iteratively adapting the generative models comprises interactive optimization in which at least one of the sparsity constraints is updated at least in part based on user feedback.

20. The method of claim 18, wherein the respective sparsity constraints comprise respective cardinality thresholds ensuring sparse reconstruction of respective vectors representing the at least one state parameter and the at least one zonal flow rate.

21. The method of claim 1, wherein iteratively adapting the generative models comprises interactive optimization in which at least one of a regularization function and a physical model is updated at least in part based on user feedback.

22. The method of claim 1, wherein at least one of determining the generative models and iteratively adapting the generative models comprises simplifying at least one of the models using at least one of proper orthogonal decomposition and discrete empirical interpolation.

23. An apparatus for determining and implementing an operational adjustment to a reservoir well comprising:
a memory; and
at least one processor coupled with the memory and configured:
to receive input data representing at least one state parameter of the reservoir well; to determine a generative model of the at least one state parameter and a generative model of the at least one zonal flow rate;
to iteratively adapt the generative models to minimize divergence from available data until the generative models and the available data converge; and
once the generative models and the available data converge, to use the generative model of the at least one zonal flow rate to compute the at least one zonal flow rate;
based on the computed at least one zonal flow rate, to determine the operational adjustment for the reservoir well; and
to communicate and to implement the operational adjustment to the reservoir well:
wherein at least one of determining the generative models and iteratively adapting the generative models comprises a joint non-convex non-linear inversion with goal-directed inversion formulation focused on inference of the at least one zonal flow rate.

24. An article of manufacture comprising a computer program product for determining and implementing an operational adjustment to a reservoir well the computer program product comprising a non-transitory machine-readable storage medium having machine-readable program code embodied therewith, said machine-readable program code comprising: machine-readable program code configured:

to receive input data representing at least one state parameter of the reservoir well; to determine a generative model of the at least one state parameter and a generative model of the at least one zonal flow rate;

to iteratively adapt the generative models to minimize divergence from available data until the generative models and the available data converge; and once the generative models and the available data converge, to use the generative model of the at least one zonal flow rate to compute the at least one zonal flow rate;

based on the computed at least one zonal flow rate, to determine the operational adjustment for the reservoir well; and to communicate and to implement the operational adjustment to the reservoir well;

wherein at least one of determining the generative models and iteratively adapting the generative models comprises a joint non-convex non-linear inversion with goal-directed inversion formulation focused on inference of the at least one zonal flow rate.

* * * * *